(12) United States Patent
Fanshier et al.

(10) Patent No.: US 10,582,654 B2
(45) Date of Patent: Mar. 10, 2020

(54) IMPLEMENT LOAD BALANCING SYSTEM

(71) Applicant: AGCO Corporation, Duluth, GA (US)

(72) Inventors: Benjamin Anson Fanshier, Hesston, KS (US); Zane Wesley Unrau, Wichita, KS (US)

(73) Assignee: AGCO Corporation, Duluth, GA (US)

( * ) Notice: Subject to any disclaimer, the term of this patent is extended or adjusted under 35 U.S.C. 154(b) by 207 days.

(21) Appl. No.: 15/706,982

(22) Filed: Sep. 18, 2017

(65) Prior Publication Data

US 2018/0077849 A1 Mar. 22, 2018

Related U.S. Application Data

(60) Provisional application No. 62/396,481, filed on Sep. 19, 2016.

(51) Int. Cl.
| | |
|---|---|
| *A01B 63/16* | (2006.01) |
| *A01B 63/14* | (2006.01) |
| *A01C 7/20* | (2006.01) |
| *A01B 63/28* | (2006.01) |
| *A01B 61/04* | (2006.01) |

(52) U.S. Cl.
CPC ............ *A01B 63/145* (2013.01); *A01B 63/28* (2013.01); *A01C 7/205* (2013.01); *A01B 61/044* (2013.01)

(58) Field of Classification Search
CPC ... A01B 63/002; A01B 63/008; A01B 63/145; A01B 63/16; A01B 63/22
USPC ......... 172/2, 4, 4.5, 10, 12, 260.5, 400, 401, 172/668
See application file for complete search history.

(56) References Cited

U.S. PATENT DOCUMENTS

| | | | |
|---|---|---|---|
| 3,700,041 A * | 10/1972 | Ryan | A01B 63/22 172/316 |
| 6,318,477 B1 | 11/2001 | Bettin | |
| 8,794,344 B2 | 8/2014 | Blunier et al. | |
| 8,903,545 B2 | 12/2014 | Riffel et al. | |
| 9,198,343 B2 * | 12/2015 | Mariman | A01B 76/00 |
| 9,814,172 B2 * | 11/2017 | Achen | A01B 49/06 |
| 9,883,623 B2 * | 2/2018 | Koch | A01B 73/065 |
| 10,045,474 B2 * | 8/2018 | Bachman | A01B 73/044 |
| 10,412,877 B2 * | 9/2019 | Barrick | A01B 5/04 |
| 2014/0000919 A1 | 1/2014 | Bachman et al. | |

(Continued)

OTHER PUBLICATIONS

UK Intellectual Property Office, International Search Report for related UK Application No. GB1616878.3, dated Apr. 3, 2017.

*Primary Examiner* — Gary S Hartmann (57) ABSTRACT

In one embodiment, an implement load balancing method comprising sensing respective loads on one or more wheels supporting a central portion and one or more wheels supporting a wing portion, the central portion and the wing portion comprising segments of an implement; and causing, via actuation of a fluid-type cylinder, pivotal movement between the central portion and the wing portion based on the sensed loads, wherein the causing comprises causing fluid flow in one direction through the fluid-type cylinder based on a load on the one or more wheels supporting the central portion being greater than a load on the one or more wheels supporting the wing portion and causing fluid flow in an opposing direction through the fluid-type cylinder based on a load on the one or more wheels supporting the central portion being less than a load on the one or more wheels supporting the wing portion.

20 Claims, 7 Drawing Sheets

(56) References Cited

U.S. PATENT DOCUMENTS

| | | |
|---|---|---|
| 2014/0214284 A1 | 7/2014 | Sauder et al. |
| 2015/0013579 A1 | 1/2015 | Mariman et al. |
| 2015/0264857 A1 | 9/2015 | Achen et al. |
| 2017/0273231 A1 * | 9/2017 | Nolte .................... A01C 7/208 |

* cited by examiner

IMPLEMENT LOAD BALANCING SYSTEM

CROSS REFERENCE TO RELATED APPLICATION

This application claims the benefit of U.S. Provisional Application No. 62/396,481 filed Sep. 19, 2016, which is hereby incorporated by reference in its entirety.

BACKGROUND

Field of Invention

The present disclosure is generally related to agricultural equipment, and more particularly, axle load balancing of agricultural implements.

Description of Related Art

Implements, such as planters, comprise a frame structure that utilizes wheels to support the frame structure. Typically, the frame structure includes a main or central section and opposing-side, pivotal wing sections. Row units of the planter are laterally spaced along the implement and are used to provide product to the soil. During field operations, the distribution of weight changes on the wheels based on an amount of product carried by the implement, the location of the product, ground conditions, implement position relative to a slope of the ground, row unit demands, and/or aftermarket planter attachments. Excessive weight on any given wheel may cause extra soil compaction, which may hinder plant yield. Also, imbalance of weight carried by the implement may cause ground engaging elements attached to the wing(s) to lose contact with the ground, likewise negatively impacting plant yield.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, an implement load balancing method comprising sensing respective loads on one or more wheels supporting a central portion and one or more wheels supporting a wing portion, the central portion and the wing portion comprising segments of an implement; and causing, via actuation of a fluid-type cylinder, pivotal movement between the central portion and the wing portion based on the sensed loads, wherein the causing comprises causing fluid flow in one direction through the fluid-type cylinder based on a load on the one or more wheels supporting the central portion being greater than a load on the one or more wheels supporting the wing portion and causing fluid flow in an opposing direction through the fluid-type cylinder based on a load on the one or more wheels supporting the central portion being less than a load on the one or more wheels supporting the wing portion.

DETAILED DESCRIPTION

Certain embodiments of an implement load balancing system and method are disclosed that automatically monitors a load (e.g., ground pressure) on supporting wheels of an implement (e.g., supporting the central and wing portions) and balances the load among each of the wheels during field operation. In some embodiments, such as for a planter, an implement load balancing system automatically adjusts a weight on each implement section (e.g., tool bar section) to ensure a maximum planter weight is available at ground engaging elements to enable proper function as the implement encounters changing conditions. In other words, certain embodiments of an implement load balancing system completely balances the load across the implement regardless of product location, product amounts, ground conditions, implement position on the soil (e.g., on slopes), row unit demands, and/or after market planter attachments.

Digressing briefly, previous systems may utilize a fixed pressure or require operator input, and may not account for the collective changes in product weight, distribution, terrain, and row unit demand. For instance, other systems may not allow for automatic addition of weight (e.g., require operator intervention) when a wing portion of the implement encounters compacted soils. Still other systems may only utilize a single-direction weight transfer (e.g., from the central portion to the wing portion) and/or require inputs from a complex set-up of sensors at multiple locations to enable weight transfer control. In contrast, certain embodiments of an implement load balancing system uses straightforward, efficient control of bi-directional weight transfer (e.g., from the central portion to one or both wing portions and from the one or both wing portions to the central portion during non-overlapping periods of time) that is performed based on wheel load sensor input, without operator intervention in the control process, and that provides a constant or substantially constant axle load among all of the wheels of the implement during a variety of operating conditions. Generally, the weight transfer occurs bi-directionally via a push-pull process that is implemented during non-overlapping periods of time.

Having summarized certain features of an implement load balancing system of the present disclosure, reference will now be made in detail to the description of the planter adjustable dampening system as illustrated in the drawings. While the implement load balancing system is described in connection with these drawings, there is no intent to limit the system to the embodiment or embodiments disclosed herein. For instance, though described in the context of a planter system, any implement in the agricultural industry (e.g., for other applications) or other industries where balanced loads are beneficial from a productivity and/or safety standpoint may use embodiments of an implement load balancing system and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

It is noted that reference herein to left and right and front and rear is from the perspective of an operator navigating a tractor or other towing vehicle that tows an implement in a forward direction. Also, reference to a wheel and loads exerted thereon is intended to include reference to a tire mounted to the wheel, where the load or similarly ground pressure includes the net forces associated with a weight of the portion of the implement supported by the wheel and the force exerted by the soil. In some embodiments, the down force systems conventionally known to be implemented at each row unit attached to the implement operate independently of the load balancing performed by certain embodiments of an implement load balancing system, though in some embodiments, the down force systems of the row units may operate cooperatively (e.g., via shared inputs/outputs) with certain embodiments of an implement load balancing system.

Figure 1:
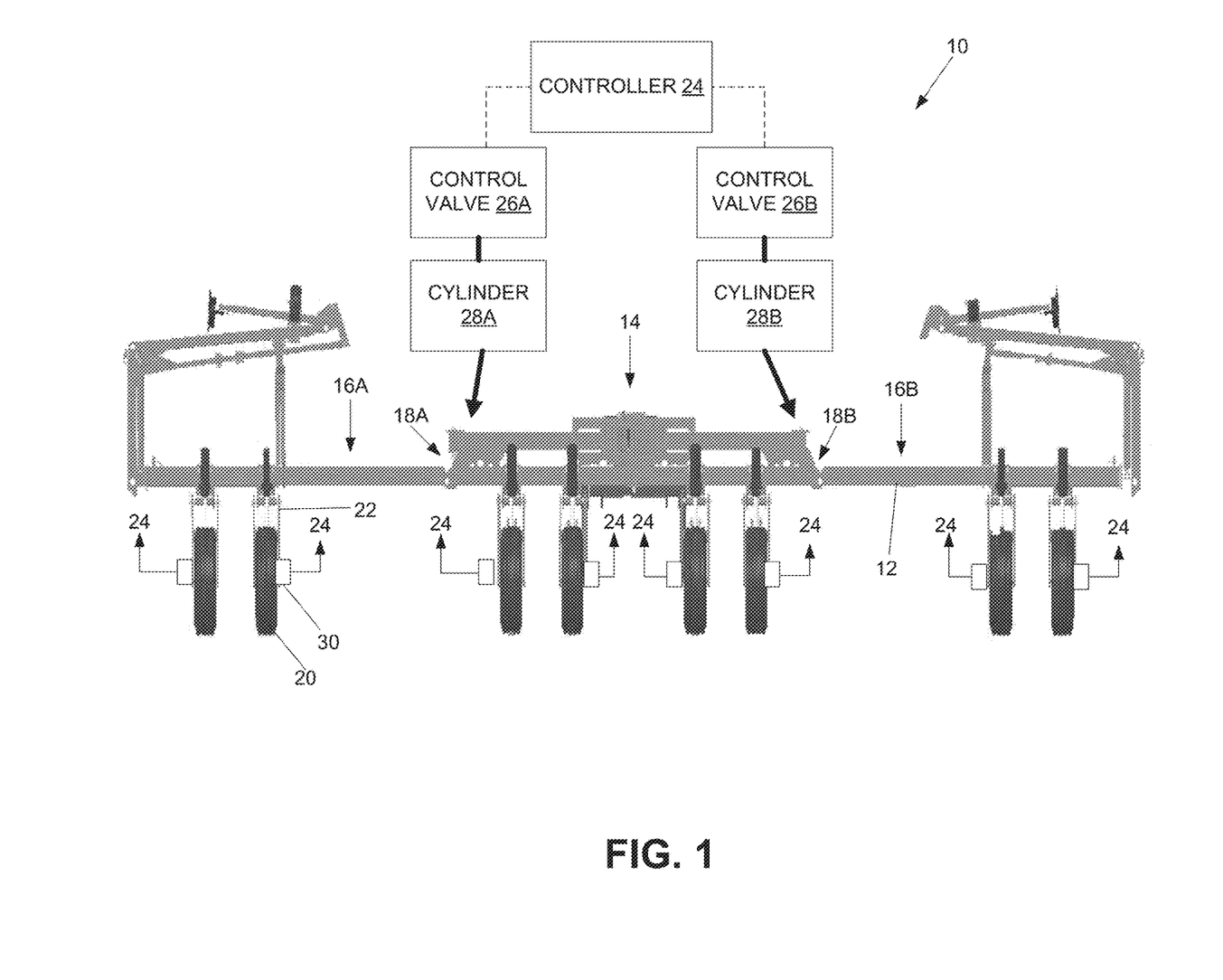
FIG. 1 is a schematic diagram that illustrates an embodiment of an implement load balancing system.

FIG. 1 is a schematic diagram that illustrates an embodiment of an implement load balancing system 10. It should be appreciated by one having ordinary skill in the art in the context of the present disclosure that the implement load balancing system 10 is illustrative of one example, and that some embodiments may have fewer or additional components, and/or the implement may be of a different design. In the depicted embodiment, the implement load balancing system 10 comprises an implement 12. The implement 12 comprises a frame (e.g., tool bar) comprising a central portion 14 and plural (e.g., two) wing portions 16A and 16B (collectively, wing portions 16) coupled to opposing ends of the central portion 14. In particular, the wing portions 16A and 16B are pivotably coupled to the respective ends of the central portion 14 at pivots 18A and 18B, respectively. The central portion 14 and wing portions 16 are typically oriented (e.g., during field operations) transverse to the direction of forward motion of the implement 12. The pivots 18A, 18B (collectively, pivots 18) may comprise hinge members of known construction. During field operations (e.g., planter operations), the wing portions 16 may be in-line with the central portion 14 during some periods of time, and during other periods of times, may be tilted up or down relative to the central portion 14. Coupled to the implement 12 are plural wheels 20, each wheel 20 coupled to the implement 12 via a pair of arms (e.g., brackets) 22 that are attached at one end to the implement 12 and at the other end to an axle of the respective wheel 20. Mounted to each wheel 20 is a tire, as is known. Note that the wheel 20 and the arms 22 are referenced in FIG. 1 in the left-most pair of wheels 20, with the reference numbers for like wheel/arm assemblies across the implement 12 omitted to avoid obfuscating certain features of the implement load balancing system 10. Hereinafter, reference to the wheels 20 includes the wheels with the tires mounted thereon. In the example depicted in FIG. 1, each wheel 20 comprises the same or similar width, and diameter of the same size, though in some embodiments, variations in wheel size may occur across the implement 12. The central portion 14 is shown in FIG. 1 as being supported by four (4) wheels 20, with a pair of wheels 20 supporting one half of the implement 12 in the central portion 14 and another pair of wheels 20 supporting the other half of the implement 12 in the central portion 14. Further, the wing portions 16 are shown with a respective pair of wheels 20 supporting each wing portion 16A, 16B. Note that the arrangement of wheels 20 (e.g., quantity, size, location, etc.) is merely illustrative of one example implement configuration, and that other arrangements of wheels 20 may be used in some embodiments. Although not shown, it is noted that plural row units would be coupled to the implement 12, spaced laterally along the implement 12.

The implement load balancing system 10 further comprises a control system that includes a controller 24, plural control valves 26 (e.g., 26A, 26B), plural fluid-type cylinders 28 (e.g., 28A, 28B, shown in block diagram form), and plural load sensors 30 (also shown in block diagram form, denoted with reference numbers in the right wheel 20 of the first pair of wheels on the left only, though shown associated with the other wheels 20 as well). It should be appreciated by one having ordinary skill in the art that the control system may comprise additional or fewer components in some embodiments. In some embodiments, the location of the sensors 30 may be located elsewhere as long as suitably-placed to monitor loads on the respective wheel 20. The controller 24 comprises hardware and/or software that controls the pivotal movement between the central portion 14 and the wing portions 16 according to a push and pull weight transfer process explained further below. The controller 24 is in communication (e.g., wireless or wired) with the control valves 26. For instance, the control valves 26 may each comprise an actuator (e.g., solenoid, transceiver, etc.) that receives control signals from the controller 24 (note that the control signals are represented with dashed lines), and a fluid-engaging portion (e.g., a poppet, spool, etc.) actuated by the actuator to control fluid flow through the control valves 26 (the fluid medium represented with bold lines, with the single-arrowed bold lines extending from the cylinders 28 representing control at the pivots 18). Each control valve 26 may be configured according to any one of a variety of known configurations, including a directional valve (e.g., 2-position valve, 3-position valve, etc.). For instance, each control valve 26 is switchably configured between one of several (e.g., three (3)) spool positions based on signaling (e.g., over a wired or wireless medium) from the controller 24 to the actuator (e.g., solenoid, or other known type of actuator of each control valve 26) either directly, or via an intermediary device. Positions of the control valves 26 may correspond to functionality enabling fluid flow in one direction through the associated cylinder 28, fluid flow in an opposite direction through the associated cylinder 28, and functionality prohibiting any hydraulic fluid flow (a neutral position). Though the control valves 26 are described as actuated via electrical energy, in some embodiments, other forms of control may be used such as pneumatic or hydraulic control, hybrid (e.g., electro-hydraulic) control, among others. The control valves 26 are in fluid communication with ports of the respective cylinders 28 (e.g., control valve 26A is in fluid communication with the cylinder 28A, and control valve 26B is in fluid communication with the cylinder 28B). The fluid may be hydraulic fluid or air. In other words, the cylinders 28 may be embodied as either hydraulic or pneumatic cylinders. In one embodiment, the cylinder 28 may be comprised of a known rod and piston design, or in some embodiments, may be of a rotary-type design.

The sensors 30 are coupled to the wheels 20 in a manner suitable to sense the load at each of the wheels 20. For instance, each sensor 30 may be secured to the respective axle portion of the associated wheel 20, and may comprise a load cell. For instance, each sensor 30 may comprise a spindle load cell. In one example operation of a spindle load cell, which is known, as the primary load pushes up against the tire, internal resultant forces acting axially resist the upward force or load. The top of the spindle compresses (pushes) while the bottom of the spindle stretches (pulls), resulting in a reactionary force that pushes back against the internal load (the internal load comprising the primary load pushing up against the tire). The axial resultant force is measured by an internal strain gauge in the spindle and is then converted to a usable value that should equal or at least approximate the value of the primary load. In some embodiments, each of the sensors 30 may be embodied as a strain gauge or other load sensing-type sensors which are each secured to one of the respective arms 22 that couple each wheel 20 to the implement 12 in a manner to measure the load on the respective wheel 20. The sensors 30 are communicatively coupled (e.g., wirelessly or wired) to the controller 24.

In operation, the controller 24 regularly (e.g., milliseconds, seconds, etc.) receives input from the sensors 30, the input indicating the loads (axle loads) on each of the wheels 20 associated with the respective one of the sensors 30. Logic (e.g., hardware and/or software) in the controller 24 compares the load of the wheels of the central portion with that of the load of the wheels of the wing portions 16 and if there is an imbalance, the logic causes the actuation of one or more of the cylinders 28 (e.g., independently controlled) to ensure the loads are evenly distributed along the implement 12. For instance, the controller 24, acting on the control valve(s) 26, may cause a weight transfer from the central portion 14 to one or both wing portions 16 via fluid flow directional change through the one or more cylinders 28 (e.g., if the loads sensed by the sensors 30 of the wheels 20 supporting the central portion 14 is greater than the loads sensed by the sensors 30 of the wheels 20 supporting the one or more wing portions 16). Similarly, the controller 24, acting on the control valve(s) 26, may cause a weight transfer from the one or more wing portions 16 to the central portion 14 via fluid flow directional change through the one or more cylinders 28 (e.g., if the loads sensed by the sensors 30 of the wheels 20 supporting the one or more wing portions 16 is greater than the loads sensed by the sensors 30 of the wheels 20 supporting the central portions 14). This bi-directional weight transfer is also referred to herein as a push-pull process, as explained further below. Note that variations of the above may be implemented in some embodiments. For instance, a single sensor 30 may be used to sense the collective load associated with each pair of wheels 20. In some embodiments, functionality of the controller 24 may be distributed among plural controllers of similar design and/or function. For instance, two controllers may be used, one for each central portion-to-wing portion pivotal movement control, wherein the controllers operate in peer-to-peer fashion, or in some embodiments, according to a master-slave configuration based on sharing of information (e.g., sensor input, load comparisons, etc.).

Figure 2:
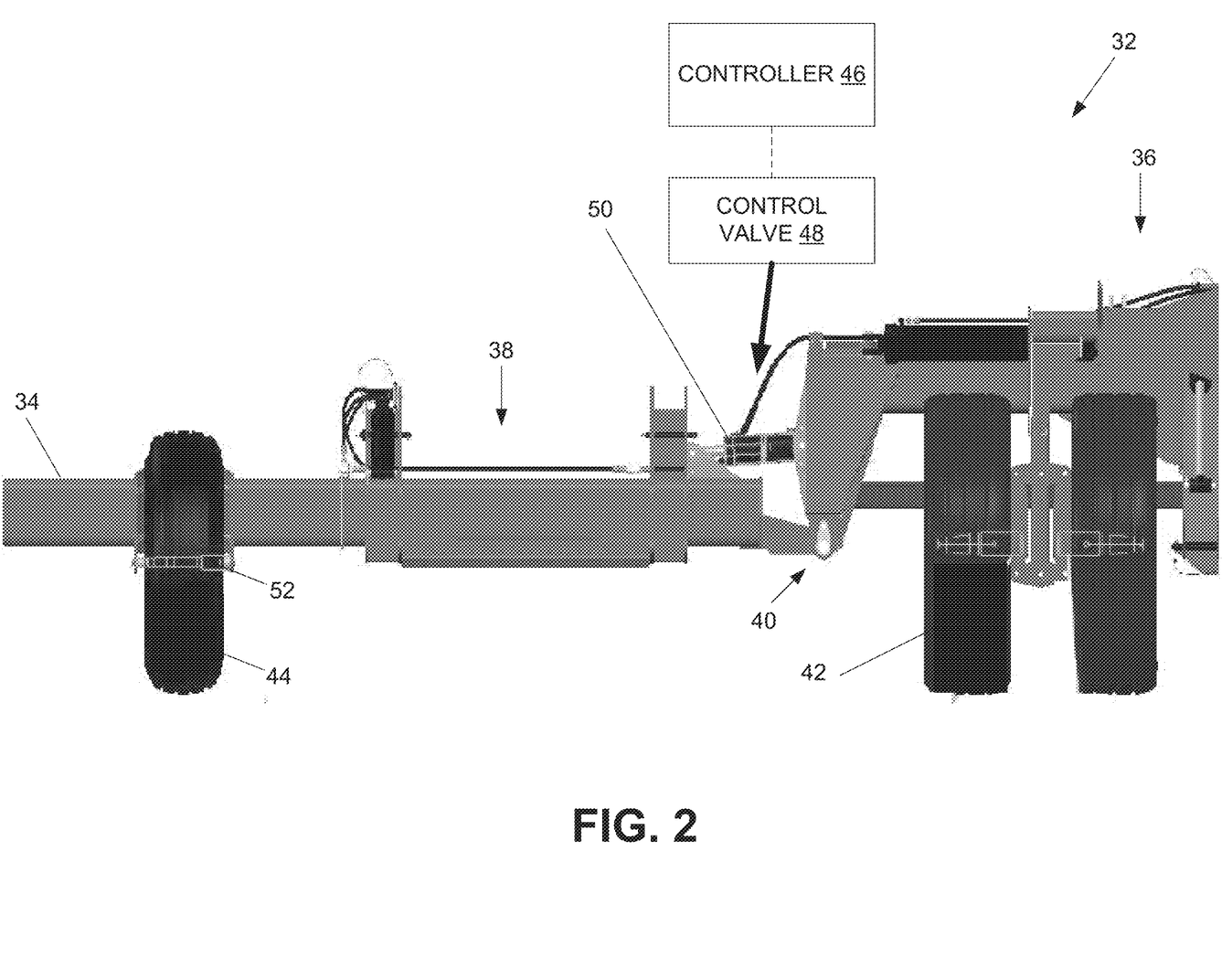
FIG. 2 is a schematic diagram that illustrates another embodiment of an implement load balancing system.

Referring to FIG. 2, shown is another example embodiment of an implement load balancing system 32. The implement load balancing system 32 is similar to the implement load balancing system 10 except for the wheel arrangement of the implement. Note that only a portion of one wing portion and half of the central portion is shown, with the understanding that components of the implement load balancing system 32 are mirrored all or in part for the other wing portion. The implement load balancing system 32 comprises an implement 34. The implement 34 comprises a central portion 36 and plural (e.g., two (2)) wing portions 38 (one shown). Describing the implement load balancing system 32 in the context of the central portion 36 and the wing portion 38 (with the understanding that a similar description applies for the other wing portion not shown), the central portion 36 and the wing portion 38 are pivotably coupled at a pivot 40 (e.g., a hinge structure). Coupled to the implement 34 in known manner are plural wheels 42 and 44 of different sizes (e.g., diameters). Mounted to each wheel 42, 44 is a suitably fitted tire as similarly described above. In the depicted embodiment, a pair of wheels 42 supports the central portion 36 (e.g., under one side or half of the central portion 34) and a single wheel 44 (of a smaller dimension than each wheel 42) supports the wing portion 38. Also shown is a control system comprising a controller 46, a control valve 48, and a fluid-type cylinder 50, all of which are of a similar structure and function as described previously for like components associated with FIG. 1. Note the dashed line between the controller 46 and the control valve 48 (e.g., the actuator of the control valve 48), which represents control signal connections, and the bold single arrow extending from the control valve 48 (representing fluid flow to/from the cylinder 50). It is noted that the cylinder 50 is shown coupled at a top-side of the implement 34, though in some embodiments, may be arranged in a different location (e.g., beneath the implement 34) in some embodiments (and similar variations for the embodiment depicted in FIG. 1). The control system also comprises plural sensors 52 (noted with a reference on the wheel 44 only, though shown as a spindle load cell at the axle location of the other wheels 42), each coupled to a respective one of the wheels 42, 44 (e.g., at the axle of the wheels 42, 44) to monitor loads on that associated wheel 42, 44. The sensors 52, of the same or similar function/structure of the sensors 30 (FIG. 1), are communicatively coupled to the controller 46, and operation for the control system depicted in FIG. 2 is similar to that described for the control system depicted in FIG. 1 with differences pertaining to the quantity of inputs and/or adjustments in load comparisons for different diameter size wheels 42, 44 (e.g., not a 1:1 load comparison, but rather, a proportional load comparison, such as a comparison of a wheel load for the wing portion 38 with a proportionally determined load, as explained further below, for the larger diameter wheels supporting the central portion 36). Given the similarity in description for FIG. 2 with the description associated with FIG. 1, discussion of the same is omitted for brevity. Also, as similarly described for the embodiment depicted in FIG. 1, variations in the quantity of components and/or arrangement of the control system are contemplated, and hence are contemplated to be within the scope of the disclosure.

Figure 3A:
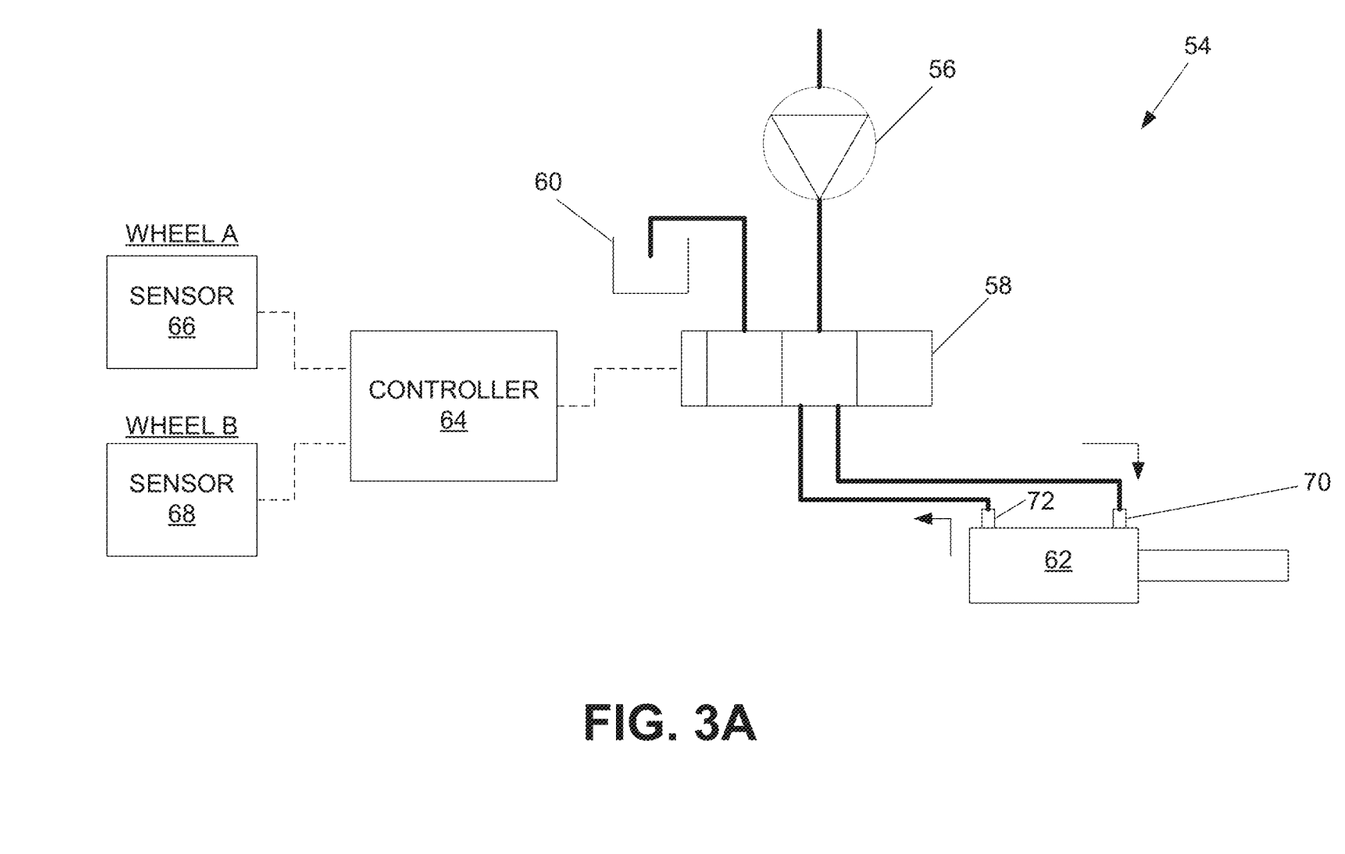
FIGS. 3A-3B are schematic diagrams that illustrates a push-pull process for weight transfer performed by an embodiment of an implement load balancing system.
Figure 3B:
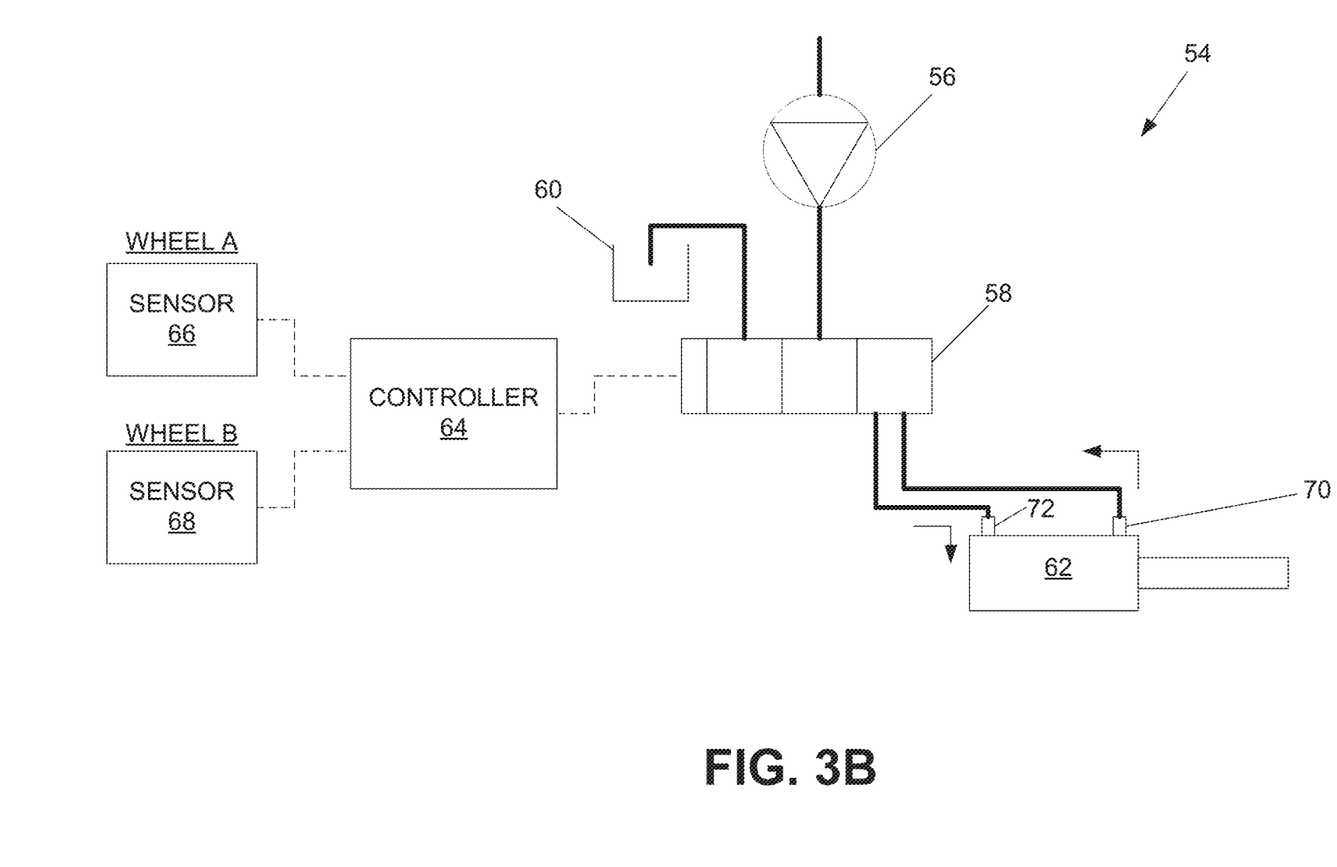

Attention is now directed to FIGS. 3A-3B, which illustrate a push-pull process for weight transfer performed by an embodiment of an implement load balancing system 54. It should be appreciated that, though described for the implement load balancing system 54, the same or similar description of the push-pull process is applicable for other configurations of implement load balancing systems (e.g., including implement load balancing systems 10 and 32). The implement load balancing system 54, shown in FIGS. 3A-3B for controlled movement between one of the wing portions of an implement and the central portion (implement not shown, but applicable to implements 12 and 34), comprises a pump 56, a (three-position) control valve 58, a reservoir 60, a hydraulic cylinder 62, a controller 64, and load sensors 66 and 68. Note that, as explained previously, the dashed lines represent control signals (e.g., electrical) over a wired or wireless medium, and the bold lines represent a hydraulic fluid medium (e.g., tubing, hoses, etc.). The control valve 58, hydraulic cylinder 62, controller 64, and load sensors 66 and 68 may be the same or similar to like-components described in association with FIGS. 1-2. Note that the implement load balancing system 54 may reside completely at an implement having a central and opposing wing portions in some embodiments, or may be distributed across plural pieces of equipment, including at the towing vehicle (e.g., tractor) and the implement in some embodiments. The control valve 58 is coupled to a discharge end of the pump 56, and receives pressurized fluid flow from the discharge of the pump 56, and controls the manner of hydraulic fluid flow into and out of the hydraulic cylinder 62 based on a spool position of the control valve 58 (the spool position controlled by the controller 64). The hydraulic cylinder 62, as is known, comprises a cylinder barrel that houses a rod and piston assembly and comprises plural (e.g., two) ports 70 and 72 to enable fluid transfer into and out of the hydraulic cylinder 62. The cylinder barrel is closed on one end (cap end), and open on the other end (head end) to permit the rod to slide in and out of the cylinder barrel. As is know, the rod and the piston assembly move due to the applied force (e.g., which is a function of the pressure and area differentials on both sides of the piston) on the piston and the amount of the flow that is directed to the hydraulic cylinder 62. For instance, due to differences in the area on the sides of the piston, the hydraulic fluid flow directed to the head end generates a higher speed of the piston than the same amount of hydraulic fluid directed to the cap end of the piston. For the same pressure of the hydraulic fluid, higher force is generated on the cap end than on the head end due to a larger area of the piston on the cap end. Thus, the speed of the piston depends on the flow rate and the effective area of the piston. The force generated by the piston depends on both the pressure difference on both sides of the piston and the difference in effective area on each side of the piston. The hydraulic fluid flow into and out of the hydraulic cylinder 62 via ports 70, 72 is controlled by the control valve 58. The pressure in the cylinder chamber(s) is dependent on one or more parameters such as external load applied to the rod, inertia loads of the piston/rod assembly, the amount of flow directed by the control valve 58, among other factors. In general, the rod and piston assembly move (e.g., extending the rod past the head end of the cylinder barrel of the hydraulic cylinder 62, or retracting the rod to further within the cylinder barrel of the hydraulic cylinder 62). The rod of the hydraulic cylinder 62 may couple to the wing portion of the implement (e.g., wing portion 16, FIG. 1), and the cap end of the hydraulic cylinder 62 may couple to the central portion of the implement (e.g., central portion 14, FIG. 1). In some embodiments, the coupling arrangement may be reversed or different. In other words, the hydraulic cylinder 62 is coupled at the pivot of the implement (e.g., pivot 18, FIG. 1) and to the central portion and wing portion in a manner suitable to cause the pivotal movement between the central portion and the wing portion. The fluid transfer into and out of the ports 70,72 is translated into rod and piston movement, as described above, which by connection between the central portion and wing portion, in turn causes the pivotal movement between the central portion and the wing portion in a pivoting direction dependent on the fluid flow direction.

The control valve 58 is depicted as a three-position control valve, and comprises an actuator that receives control signals (e.g., wirelessly or over a wired medium) from the controller 64. The control signals dictate the control valve position configuration, and hence whether fluid transfer should occur into the port 70 and return via port 72 (FIG. 3A), or into port 72 and out of port 70. The controller 64 determines the direction of the flow, and hence the direction of weight distribution transfer according to a push-pull process, based on the loads sensed on the wheels (e.g., wheels 20, FIG. 1). Assuming two wheels are involved, a wheel A supporting the central portion of the implement and a wheel B supporting a wing portion pivotably coupled to the central portion, the sensor 66 senses the load on wheel A and the sensor 68 senses the load on wheel B. Referring to FIG. 3A, the controller 64 receives the signals from the sensors 66 and 68, and generally performs the following determination (based on equal sized wheels): if the load on wheel A is greater than the load on wheel B, push the load (e.g., weight transfer) from wheel A to wheel B (FIG. 3A), and if the load of wheel A is less than the load of wheel B, pull the load from wheel B to wheel A (FIG. 3B). In other words, based on the receipt and comparison of sensed load values at sensors 66, 68, the push determination is realized by the controller 64 signaling the control valve actuator to change the spool position of the control valve 58 to enable fluid flow into port 70 and out of port 72, enabling the weight transfer (e.g., via a pivotal downward movement of the wing portion relative to the central portion based on rod extension) from the central portion to the wing portion as depicted by the arrows proximal to the hydraulic cylinder 62 in FIG. 3A. Likewise, based on the receipt and comparison of sensed load values at sensors 66, 68, the weight transfer pull function is realized by the controller 64 signaling the control valve actuator to change the spool position of the control valve 58 to enable fluid flow from port 70 (or similarly, via fluid flow into port 72 and out of port 70), enabling the weight transfer from the wing portion to the central portion (e.g., via a pivotal upward movement of the wing portion relative to the central portion based on rod retraction). Note that the controller logic may be modified based on quantity of wheels and/or size differences among the wheels. For instance, if the wheel supporting the central portion is double the size of the wheel supporting the wing portion, then the load of A is compared to the half the load of B (instead of a 1:1 comparison). Variations (e.g., in proportion) to the above based on a different quantity and/or size of wheels are readily ascertainable based on the above description, and omitted here for brevity. Also, as set forth above, the push-pull process has been described in the context of controlled pivotal movement between a single wing portion and a central portion, though in some embodiments, the controller 64 may also receive inputs from sensors that sense wheel loads of the wheels on the opposing wing (and opposing side of the central portion) and provide signals to the control valve 58 and the control valve for the opposing wing portion to ensure the push-pull process maintains balance across all of the wheels of the implement based on the location-specific conditions of product load and/or terrain sensed at each wheel. In some embodiments, the controller 64 may receive inputs from another controller dedicated to relative movement between the other wing and the central portion, and provide commands to, or share determinations with, the other controller to ensure an adaptive approach to the push-pull process (to ensure loads are distributed in a balanced approach across all of the implement wheels based on the product load conditions and/or terrain).

Figure 4A:
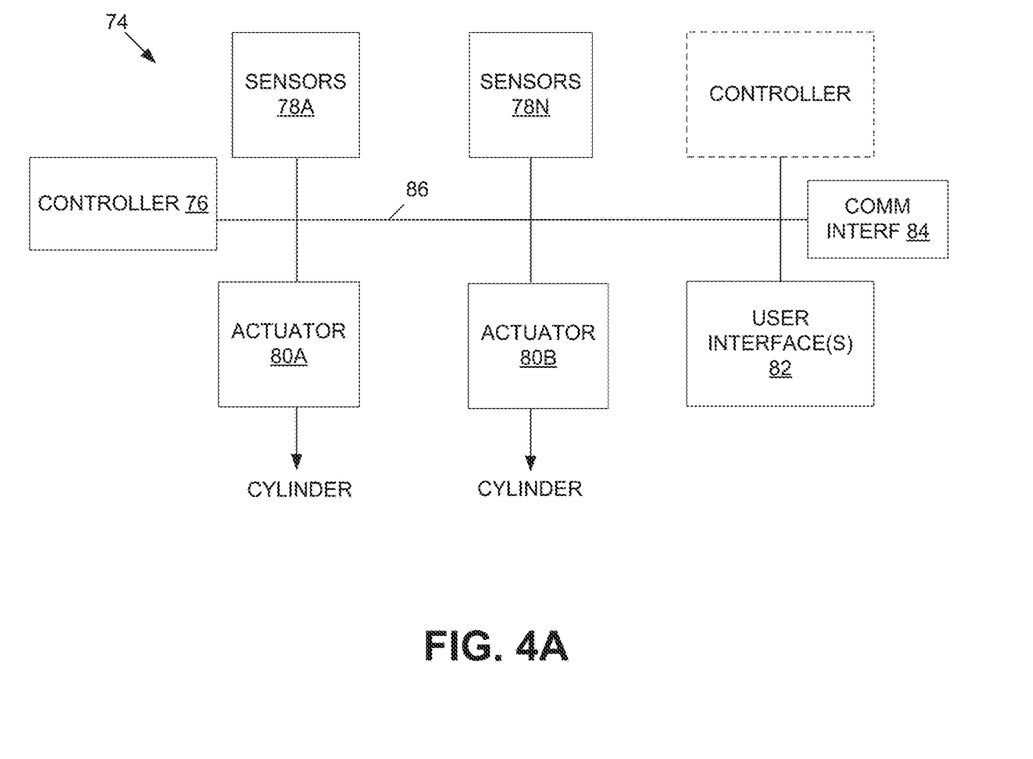
FIG. 4A is a block diagram that illustrates an embodiment of an example control system for an embodiment of an implement load balancing system.

Attention is now directed to FIG. 4A, which illustrates an embodiment of an example control system 74 for an implement load balancing system. One having ordinary skill in the art should appreciate in the context of the present disclosure that the example control system 74 is merely illustrative, and that some embodiments of control systems may comprise fewer or additional components, and/or some of the functionality associated with the various components depicted in FIG. 4A may be combined, or further distributed among additional components, in some embodiments. For instance, in one embodiment, the control system 74 is distributed among the implement and the towing vehicle. In some embodiments, the control system 74 is hosted entirely by the implement. In some embodiments, the control system 74 is distributed among the implement and a remote computing device (e.g., in communication with components of the control system 74 via telemetry or radio frequency communications), and in some embodiments, the control system 74 is distributed among the towing vehicle, the implement, and a remote computing device. For purposes of brevity, attention is focused on an embodiment where the control system 74 is distributed among the implement and a towing vehicle (which may be coupled to the implement via a known hitch and draw bar assembly), with the understanding that other configurations may be used in some embodiments with similar applicability. The control system 74 comprises one or more controllers, including controller 76 (an optional controller is shown with a dashed box, with emphasis below on the use of a single controller for sake of brevity), plural load sensors 78 (e.g., 78A through 78N), plural (e.g., two) actuators 80A, 80B, user interfaces 82, and a communications interface 84, all coupled over a network 86, such as a controller area network (CAN), though not limited to a CAN network or a single network. In one embodiment, the network 86 may comprise a wired network (e.g., twisted pair, copper, etc.), a wireless network (e.g., based on IEEE 802.11, Bluetooth, Near Field Communications (NFC), etc.), or a combination of a wired and wireless network. The controller 76 is explained further below in association with FIG. 4B. In one embodiment, the load sensors 78A-78N comprise load cells (e.g., spindle load cells) or other types of load sensors, with each load sensor 78 configured to sense the load of a single wheel (though in some embodiments, may monitor a collective load of more than a single wheel) of the implement and communicate the sensed load to the controller 76 (e.g., via the network 86). As indicated above, each of the load sensors 78A-78N may be affixed to an axle of each wheel of the implement. The load sensors 78A-78N may be of the same function, structure, and/or arrangement as those described previously, including sensors 30 (FIG. 1), 52 (FIG. 2), and 66, 68 (FIGS. 3A-3B). The actuators 80A, 80B may be electrical or electromagnetic actuators (or in some embodiments, based on another medium, such as air), and are configured to adjust a spool (or poppet) of the corresponding control valve (e.g., control valve 58, FIG. 3A) to enable a push or pull weight transfer based on bi-directional flow into and out of a cylinder (e.g., hydraulic cylinder 62, FIG. 3A). Each actuator 80A, 80B is used for the respective control valve for the respective wing portion, and receives control signals from the controller 76 as described previously. The actuators 80A, 80B may be the same of similar as those described above for control valves 26 (FIG. 1), 48 (FIG. 2), and 58 (FIGS. 3A-3B).

The user interfaces 82 may include an FNR handle, a keyboard/pad and/or mouse, a display device (e.g., toughtype display, liquid crystal diode (LCD), plasma-based, etc.), and/or other input and output devices (e.g., a microphone for audible input, a speaker for audible output, in some embodiments). In other words, the user interfaces 82 may enable an operator to monitor implement wheel load levels and automatic (without operator intervention) changes to those load levels, among other functions of the implement or towing vehicle.

The communications interface 84 (comm interf) comprises suitable hardware and/or software to enable wireless communications with the control system 74, and includes a radio frequency modem and/or cellular modem.

Figure 4B:
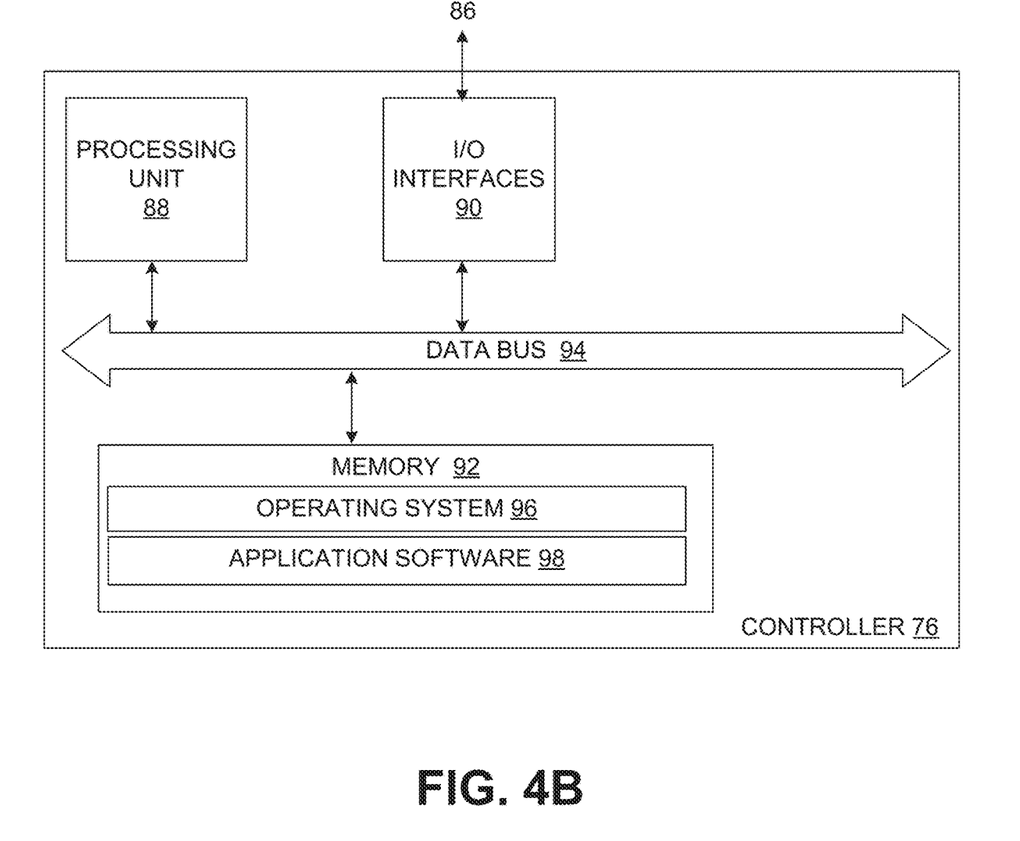
FIG. 4B is a block diagram that illustrates an embodiment of an example controller for the control system of FIG. 4A.

Referring to FIG. 4B, shown is an embodiment of the example controller 76 depicted in FIG. 4A, which comprises a computer architecture. It should be appreciated by one having ordinary skill in the art that the controller 76 depicted in FIG. 4B is one example illustration, and that in some embodiments, fewer, greater, and/or different components may be used. Also, it should be appreciated by one having ordinary skill in the art that certain well-known components of computer systems are omitted here to avoid obfuscating relevant features of the controller 76. The controller 76 may be of the same or similar architecture and/or function as controller 24 (FIG. 1), controller 46 (FIG. 2), or controller 64 (FIGS. 3A-3B). In one embodiment, the controller 76 comprises one or more processing units 88, input/output (I/O) interface(s) 90, and memory 92, all coupled to one or more data busses, such as data bus 94. The memory 92 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 92 may store a native operating system, one or more native applications, emulation systems, or emulated applications for any of a variety of operating systems and/or emulated hardware platforms, emulated operating systems, etc. In the embodiment depicted in FIG. 4B, the memory 92 comprises an operating system 96 and application software 98. The application software 98 comprises executable code that receives sensor input (e.g., from sensors 78A-78N) corresponding to plural axle wheel loads, compares the axle wheel loads, and issues commands to the actuators 80A, 80B to effect a corresponding push or pull weight transfer mechanism with the associated cylinder(s). The application software 98, through implementing the push-pull process, ensures that the implement wheel loads are balanced regardless of product location (e.g., if the product to be dispensed to the soil is located in hoppers in the central portion, the wing portion, or a combination of both), product amounts, ground conditions, implement position on slopes, row unit demands, or aftermarket planter attachments. As the push-pull process/functionality as facilitated by the controller 76 has been described previously, the discussion of the same is omitted here for brevity. Additional software may be used in some embodiments, including graphical user interface (GUI) software, browser software, communications software, etc. It should be appreciated that the application software 98 may be distributed among one or more software modules in the controller 76, or distributed in whole or in part in a remote computing device. In some embodiments, a separate storage device may be coupled to the data bus 94 or coupled via the I/O interfaces 90, such as a persistent memory (e.g., optical, magnetic, and/or semiconductor memory and associated drives).

Execution of the application software 98 is implemented by the processing unit 88 under the auspices of the operating system 96. In some embodiments, the operating system 96 may be omitted and a more rudimentary manner of control implemented. The processing unit 88 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 76.

The I/O interfaces 90 provide one or more interfaces to the network 86. For instance, the I/O interfaces 90 receive wired or wireless signals from the sensors 78A-78N, and serve as an interface for the transmittal of control signals to the actuators 80A, 80B.

Note that the controller 76 may comprise additional functionality, including one or more of the functions provided by the control system 74.

When certain embodiments of the controller 76 are implemented at least in part in logic configured as software/firmware, as depicted in FIG. 4B, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 76 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
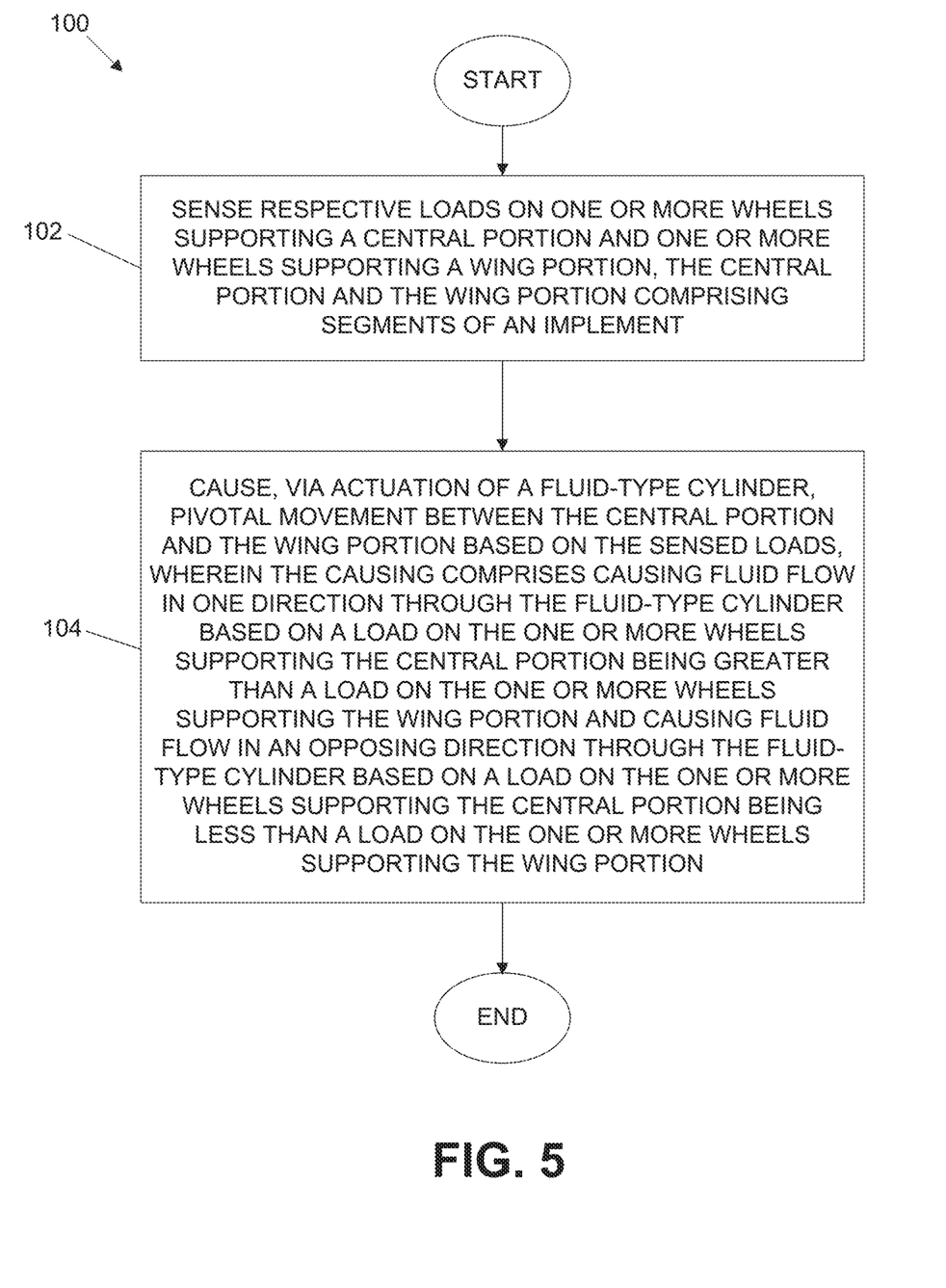
FIG. 5 is a flow diagram that illustrates an embodiment of an example implement load balancing method.

In view of the above description, it should be appreciated that one embodiment of an implement load balancing method, shown in FIG. 5 and denoted as method 100, comprises an implement load balancing method comprising sensing respective loads on one or more wheels supporting a central portion and one or more wheels supporting a wing portion, the central portion and the wing portion comprising segments of an implement (102); and causing, via actuation of a fluid-type cylinder, pivotal movement between the central portion and the wing portion based on the sensed loads, wherein the causing comprises causing fluid flow in one direction through the fluid-type cylinder based on a load on the one or more wheels supporting the central portion being greater than a load on the one or more wheels supporting the wing portion and causing fluid flow in an opposing direction through the fluid-type cylinder based on a load on the one or more wheels supporting the central portion being less than a load on the one or more wheels supporting the wing portion (104).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention are merely possible examples of implementations, merely set forth for a clear understanding of the principles of the disclosure. Many variations and modifications may be made to the above-described embodiment(s) of the disclosure without departing substantially from the spirit and principles of the disclosure. For instance, although described as using a dampening device per row unit, some embodiments may use a dampening device for plural row units. All such modifications and variations are intended to be included herein within the scope of this disclosure and protected by the following claims.

At least the following is claimed:

1. An implement load balancing system, comprising:
    a frame comprising a central portion and first and second wing portions each pivotably coupled to the central portion;
    plural wheels each comprising an axle coupled to the frame, the plural wheels coupled to the central portion and the first and second wing portions;
    plural sensors coupled to the respective plural wheels, each of the plural sensors configured to sense a load on one of the plural wheels; and
    a control system configured to maintain a substantially constant axle load between the wheels coupled to the central portion and the wheels coupled to the first and second wing portions by bi-directionally transferring during non-overlapping periods of time, based on input from the plural sensors, the load between the central portion and one or more of the first and second wing portions, the control system comprising:
    a controller;
    a first control valve in communication with the controller; and
    a first cylinder configured to cause pivotal movement between the central portion and the first wing portion, the first cylinder comprising first and second ports fluidly coupled to the first control valve, wherein the controller is configured to push a first load in one direction by causing fluid to flow from the first control valve to the first port based on a first input from at least a portion of the plural sensors, and wherein the controller is further configured to pull a second load by causing fluid to flow from the first port to the first control valve based on a second input from the at least a portion of the plural sensors.

2. The system of claim 1, wherein the control system further comprises:
    a second control valve in communication with the controller; and
    a second cylinder configured to cause pivotal movement between the central portion and the second wing portion, the second cylinder comprising third and fourth ports fluidly coupled to the second control valve, wherein the controller is configured to push a third load by causing fluid to flow from the second control valve to the third port based on a third input from at least a portion of the plural sensors, and wherein the controller is further configured to pull a fourth load by causing fluid to flow from the third port to the second control valve based on a fourth input from the at least a portion of the plural sensors.

3. The system of claim 1, wherein the control system further comprises:
another controller in communication with the controller;
a second control valve in communication with the another controller; and
a second cylinder configured to cause pivotal movement between the central portion and the second wing portion, the second cylinder comprising third and fourth ports fluidly coupled to the second control valve, wherein the another controller is configured to push a third load by causing fluid to flow from the second control valve to the third port based on a third input from at least a portion of the plural sensors, and wherein the another controller is further configured to pull a fourth load by causing fluid to flow from the third port to the second control valve based on a fourth input from the at least a portion of the plural sensors.

4. The system of claim 1, wherein the first cylinder comprises a hydraulic cylinder.

5. The system of claim 1, wherein the first cylinder comprises a pneumatic cylinder.

6. The system of claim 1, wherein the plural wheels are of at least two different size diameters.

7. The system of claim 1, wherein the plural wheels are all of a same size diameter.

8. The system of claim 1, wherein each of the plural sensors comprises load cells.

9. The system of claim 1, wherein the frame comprises a bar extending transverse to a direction of motion enabled by the plural wheels, and further comprising plural row units coupled to and laterally spaced along the bar.

10. The system claim 1, wherein the fluid flows through the first cylinder from the first port to the second port based on the first input, and wherein the fluid flows through the first cylinder from the second port to the first port based on the second input.

11. The system of claim 1, wherein the controller is configured to push the first load based on a ground pressure sensed by at least one of the plural sensors associated with at least one of the plural wheels corresponding to the central portion greater than a ground pressure sensed by at least one of the plural sensors associated with at least one of the plural wheels corresponding to the first wing portion, the push of the first load corresponding to a transfer of the first load from the central portion to the first wing portion.

12. The system of claim 1, wherein the controller is configured to pull the second load based on a ground pressure sensed by at least one of the plural sensors associated with at least one of the plural wheels corresponding to the central portion less than a ground pressure sensed by at least one of the plural sensors associated with at least one of the plural wheels corresponding to the first wing portion, the pull of the second load corresponding to a transfer of the second load from the first wing portion to the central portion.

13. The system of claim 1, further comprising a pump fluidly coupled to the first control valve, wherein the control system causes the push of the first load or the pull of the second load without operator intervention.

14. An implement load balancing system, comprising:
a frame comprising a central portion and a wing portion pivotably coupled to the central portion;
plural wheels comprising a first wheel coupled to the central portion and a second wheel coupled to the wing portion;
plural sensors comprising a first sensor configured to sense a load on the first wheel and a second sensor configured to sense a load on the second wheel;
a controller;
a control valve in communication with the controller; and
a cylinder configured to cause pivotal movement between the central portion and the wing portion, the cylinder comprising first and second ports fluidly coupled to the control valve, wherein the controller is configured to cause fluid flow from the control valve to the first port based on inputs from the first and second sensors indicating a load of the first wheel greater than a load of the second wheel, the controller further configured to cause fluid to flow from the first port to the control valve based on inputs from the first and second sensors indicating a load of the first wheel less than a load of the second wheel.

15. The system of claim 14, wherein the plural wheels comprises one or more additional wheels coupled to the central portion, the wing portion, or a combination of the central portion and the wing portion, and wherein the plural sensors comprises one or more additional sensors coupled respectively to the one or more additional wheels, wherein the inputs based on the first and second sensors further include one or more inputs from the one or more additional sensors.

16. The system of claim 14, wherein the cylinder comprises a hydraulic cylinder or a pneumatic cylinder.

17. The system of claim 14, further comprising one or more additional control valves that function in cooperation with the control valve.

18. The system of claim 14, wherein each of the plural sensors comprises a load cell.

19. The system of claim 14, further comprising a pump fluidly coupled to the control valve.

20. An implement load balancing method, the method comprising:
sensing respective loads on one or more wheels supporting a central portion and one or more wheels supporting a wing portion, the central portion and the wing portion comprising segments of an implement; and
causing, via actuation of a fluid-type cylinder, pivotal movement between the central portion and the wing portion based on the sensed loads, wherein the causing comprises causing fluid flow in one direction through the fluid-type cylinder based on a load on the one or more wheels supporting the central portion being greater than a load on the one or more wheels supporting the wing portion and causing fluid flow in an opposing direction through the fluid-type cylinder based on a load on the one or more wheels supporting the central portion being less than a load on the one or more wheels supporting the wing portion.

* * * * *